(12) United States Patent
Alzamora et al.

(10) Patent No.: US 8,919,684 B1
(45) Date of Patent: Dec. 30, 2014

(54) AUXILIARY DRAG SYSTEM FOR A SPINNING REEL

(76) Inventors: Jason L. Alzamora, Naples, FL (US); Gerardo Alzamora, Naples, FL (US)

( * ) Notice: Subject to any disclaimer, the term of this patent is extended or adjusted under 35 U.S.C. 154(b) by 304 days.

(21) Appl. No.: 13/352,759

(22) Filed: Jan. 18, 2012

Related U.S. Application Data

(63) Continuation-in-part of application No. 12/855,179, filed on Aug. 12, 2010, now abandoned.

(51) Int. Cl.
*A01K 89/02* (2006.01)

(52) U.S. Cl.
USPC .......................... 242/246; 242/245; 242/303

(58) Field of Classification Search
CPC .................... A01K 89/027; A01K 89/0117
USPC ....................... 242/244–246, 302–304, 319
See application file for complete search history.

(56) References Cited

U.S. PATENT DOCUMENTS

| | | | |
|---|---|---|---|
| 3,948,465 A * | 4/1976 | Scusa | 242/264 |
| 4,470,554 A | 9/1984 | Kobayashi et al. | |
| 4,702,431 A | 10/1987 | Kaneko | |
| 4,725,012 A | 2/1988 | Councilman | |
| 4,776,526 A | 10/1988 | Saito | |
| 4,881,699 A | 11/1989 | Emura | |
| 5,195,698 A | 3/1993 | Kyoichi | |
| D352,763 S | 11/1994 | Myojo et al. | |
| 5,511,735 A | 4/1996 | Kaneko | |
| 6,575,392 B1 | 6/2003 | Hong | |
| 6,769,639 B2 * | 8/2004 | Koelewyn et al. | 242/246 |
| 6,966,516 B2 | 11/2005 | Koelewyn et al. | |
| 7,344,099 B1 * | 3/2008 | Ivie | 242/246 |

* cited by examiner

*Primary Examiner* — Emmanuel M Marcelo
*Assistant Examiner* — Angela Caligiuri

(57) ABSTRACT

An auxiliary drag system for a spinning reel comprising a generally cylindrical reel body having a standard rotor assembly for spooling fishing line onto a spool member. A standard handle assembly is operatively attached to the rotor assembly via drive gears. A standard spool assembly comprises the spool member and a spool shaft. A standard primary drag system has a clutch assembly located in the spool assembly. A spool shaft sleeve is generally located over the spool shaft and through the reel body and the rotor assembly. Upon rotation of the auxiliary drag lever in a first direction, the spool shaft sleeve is moved in an inline direction with respect to the spool shaft via the threaded auxiliary drag nut toward and frictionally engaging a spool member bushing located on the spool member thereby imposing a degree of frictional drag to the rotation of the spool member.

9 Claims, 4 Drawing Sheets

PRIOR ART

AUXILIARY DRAG SYSTEM FOR A SPINNING REEL

CROSS REFERENCE

This application claims priority to U.S. provisional application Ser. No. 12/855,179 filed Aug. 12, 2010 as a continuation-in-part, the specification of which is incorporated herein by reference in its entirety.

BACKGROUND OF THE INVENTION

Drag-regulating systems for spinning reels used on fishing rods have been in existence for a long time. Typically, a drag system may be used to keep from ripping a hook away from a caught fish as well as to provide a force of resistance that aids in tiring out the fish as it is reeled in. The present invention features a novel auxiliary drag system for spinning reels of fishing rods, which allows a user to quickly and easily adjust the drag while reeling in a fish independent of the primary drag system.

SUMMARY

The present invention features an auxiliary drag system for a spinning reel providing rapid adjustment for drag when fishing. In some embodiments, the system comprises a generally cylindrical reel body having a standard rotor assembly for spooling fishing line onto a spool member. In some embodiments, a standard handle assembly is operatively attached to the rotor assembly via drive gears. In some embodiments, a standard spool assembly comprises the spool member and a spool shaft. In some embodiments, a standard primary drag system has a clutch assembly located in the spool assembly. In some embodiments, the spool member and the spool shaft are operatively connected via the clutch assembly In some embodiments, a spool shaft sleeve anterior end comprises a spool shaft sleeve bushing. In some embodiments, the spool shaft sleeve is generally located over the spool shaft. In some embodiments, the spool shaft sleeve passes through the reel body and the rotor assembly. In some embodiments, the spool shaft sleeve posterior end interfaces with an auxiliary drag lever slidably located in a lever track located in the reel body. In some embodiments, the auxiliary drag lever comprises a centrally located threaded auxiliary drag nut. In some embodiments, a threaded spool shaft posterior end passes through the threaded auxiliary drag nut.

In some embodiments, upon rotation of the auxiliary drag lever in a first direction, the spool shaft sleeve is moved in an inline direction with respect to the spool shaft via the threaded auxiliary drag nut toward and frictionally engaging a spool member bushing located on the spool member thereby imposing a degree of frictional drag to the rotation of the spool member. In some embodiments, upon rotation of the auxiliary drag lever in a second direction, the spool shaft sleeve is moved in an inline direction with respect to the spool shaft via the threaded auxiliary drag nut away from and frictionally disengaging the spool member bushing thereby reducing the degree of frictional drag imposed upon the rotation of the spool member.

Any feature or combination of features described herein are included within the scope of the present invention provided that the features included in any such combination are not mutually inconsistent as will be apparent from the context, this specification, and the knowledge of one of ordinary skill in the art. Additional advantages and aspects of the present invention are apparent in the following detailed description and claims.

DESCRIPTION OF PREFERRED EMBODIMENTS

Figure 1:
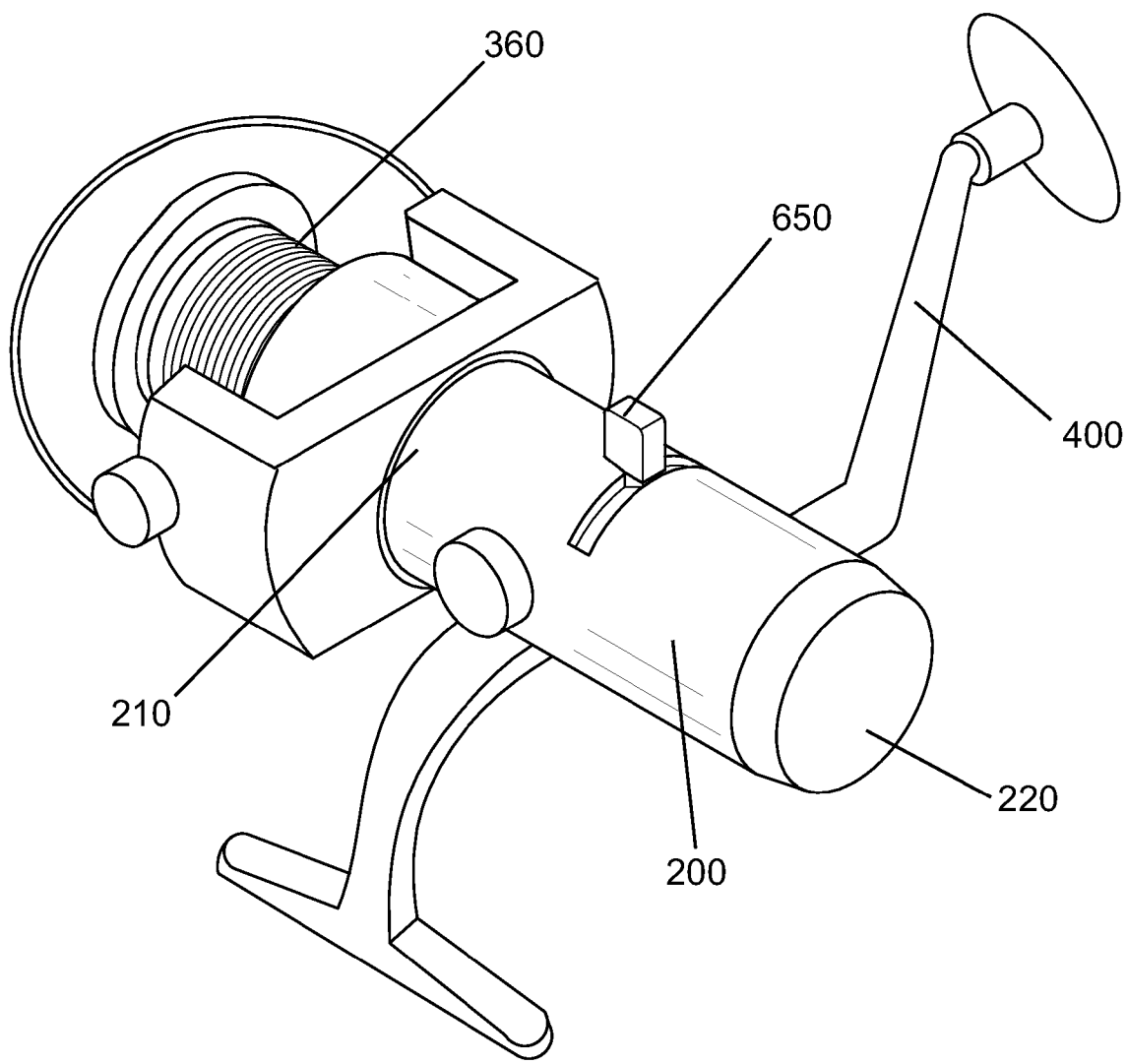
FIG. 1 is a perspective view of the present invention.
Figure 2:
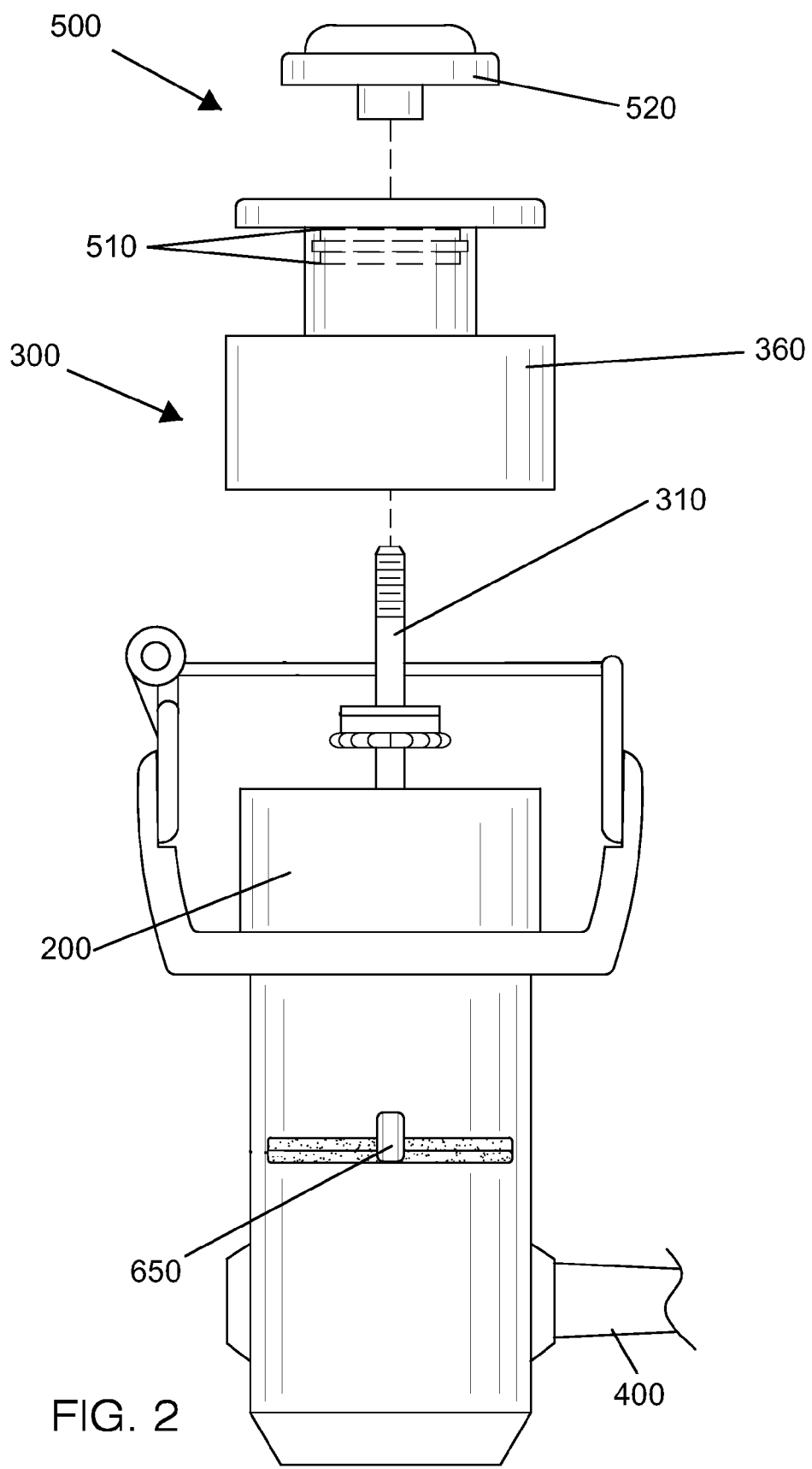
FIG. 2 is an exploded top view of the present invention.
Figure 3:
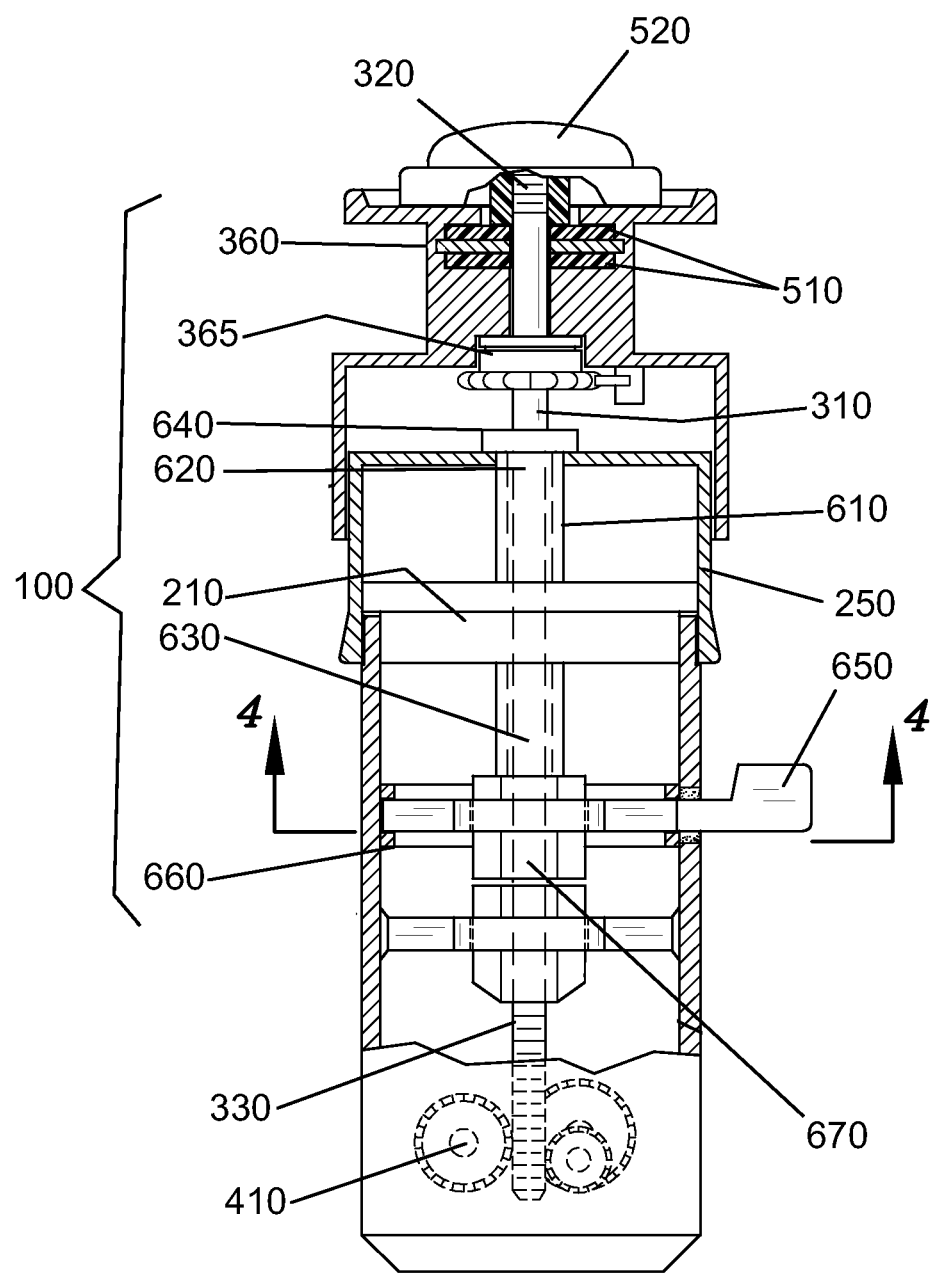
FIG. 3 is a cross-sectional side view of the present invention.

Following is a list of elements corresponding to a particular element referred to herein:
100 Auxiliary drag system
200 Reel body
210 Reel body anterior end
220 Reel body posterior end
250 Rotor assembly
300 Spool assembly
310 Spool shaft
320 Spool shaft anterior end
330 Spool shaft posterior end
360 Spool member
65 Spool member bushing
400 Handle assembly
410 Drive gears
500 Primary drag assembly
510 Clutch assembly
520 Primary drag nut
610 Spool shaft sleeve
620 Spool shaft sleeve anterior end
630 Spool shaft sleeve posterior end
640 Spool shaft sleeve bushing
650 Auxiliary drag lever
660 Lever track
670 Threaded auxiliary drag nut Referring now to FIG. 1-5, the present invention features an auxiliary drag system (100) for a spinning reel providing rapid adjustment for drag when fishing.

In some embodiments, the system (100) comprises a generally cylindrical reel body (200) having a reel body anterior end (210) and a reel body posterior end (220). In some embodiments, the reel body (200) comprises a standard rotor assembly (250) for spooling fishing line onto a spool member (360). In some embodiments, the reel body (200) comprises a rotor assembly (250) located on the reel body anterior end (210). In some embodiments, the reel body (200) comprises a standard handle assembly (400) operatively attached to the rotor assembly (250) via drive gears (410). In some embodiments, the handle assembly (400) is located on the reel body posterior end (220).

In some embodiments, the reel body (200) comprises a standard spool assembly (300) comprising the spool member (360) and a spool shaft (310). In some embodiments, the spool member (360) is located on the reel body anterior end (210). In some embodiments, the spool shaft (310) extends through a central cross-section of the reel body (200). In some embodiments, a standard primary drag system (500) having a clutch assembly (510) is located in the spool assembly (300).

In some embodiments, the spool member (360) and the spool shaft (310) are operatively connected via the clutch assembly (510).

In some embodiments, the auxiliary drag system comprises a spool shaft sleeve (610) having a spool shaft sleeve anterior end (620) and a spool shaft sleeve posterior end (630). In some embodiments, the spool shaft sleeve anterior end (620) comprises a spool shaft sleeve bushing (640) located on the end. In some embodiments, the spool shaft sleeve (610) is generally located over the spool shaft (310). In some embodiments, the spool shaft sleeve passes through the reel body (200) and the rotor assembly (250).

In some embodiments, the spool shaft sleeve posterior end (630) interfaces with an auxiliary drag lever (650) slidably located in a lever track (660). In some embodiments, the lever track (660) is located in the reel body (200). In some embodiments, the auxiliary drag lever (650) comprises a centrally located threaded auxiliary drag nut (670) affixed to the center. In some embodiments, a threaded spool shaft posterior end (330) passes through the threaded auxiliary drag nut (670).

In some embodiments, upon rotation of the auxiliary drag lever (650) in a first direction, the spool shaft sleeve (610) is moved in an inline direction with respect to the spool shaft (310) via the threaded auxiliary drag nut (670) toward and frictionally engaging a spool member bushing (365) located on the spool member (360) thereby imposing a degree of frictional drag to the rotation of the spool member (360). In some embodiments, the first direction moves the spool shaft sleeve (610) toward the spool member bushing (365) and the reel body anterior end (210). In some embodiments, a first direction of rotation for the auxiliary drag lever (650) is a clockwise rotation when facing the reel body posterior end (220).

In some embodiments, upon rotation of the auxiliary drag lever (650) in a second direction, the spool shaft sleeve (610) is moved in an inline direction with respect to the spool shaft (310) via the threaded auxiliary drag nut (670) away from and frictionally disengaging the spool member bushing (365) thereby reducing the degree of frictional drag imposed upon the rotation of the spool member (360). In some embodiments, the second direction moves the spool shaft sleeve (610) away from the spool member bushing (365) and the reel body anterior end (210). In some embodiments, a second direction of rotation for the auxiliary drag lever (650) is a counterclockwise rotation when facing the reel body posterior end (220).

In some embodiments, a spool member bushing (365) is pressed into a posterior end of the spool member (360). In some embodiments, the spool member bushing (365) is metal. In some embodiments, the spool member bushing (365) is brass. In some embodiments, the spool member bushing (365) traverses the inside surface of the spool member (360) from a front surface to a rear surface. In some embodiments, the spool member bushing (365) traverses a portion of the inside surface of the spool member (360). In some embodiments, the spool member bushing (365) comprises a bearing.

In some embodiments, an aperture in the reel body (200) from which the auxiliary drag lever (650) projects is generally lined with a seal to inhibit dust or water entry into the reel body (200).

Figure 4:
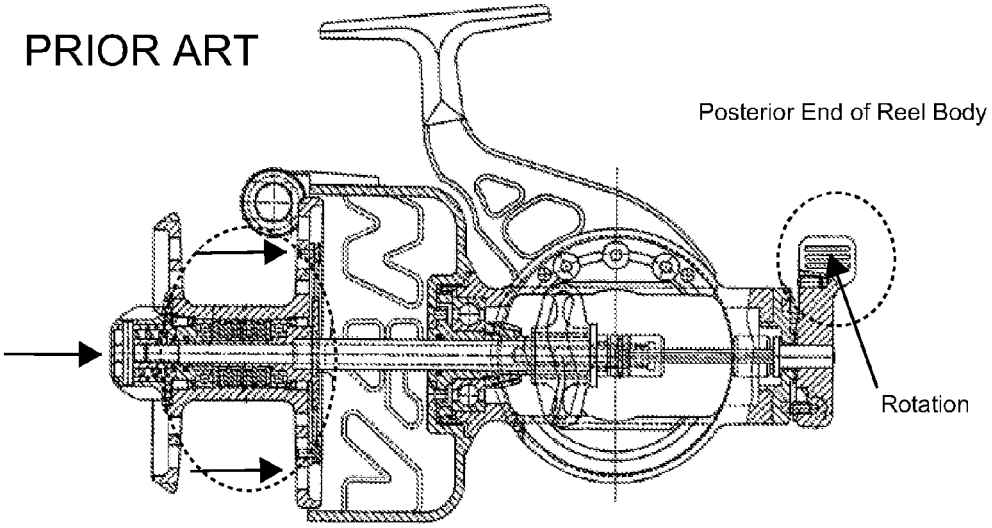
FIG. 4 is a cross-sectional side view of the prior art.
Figure 5:
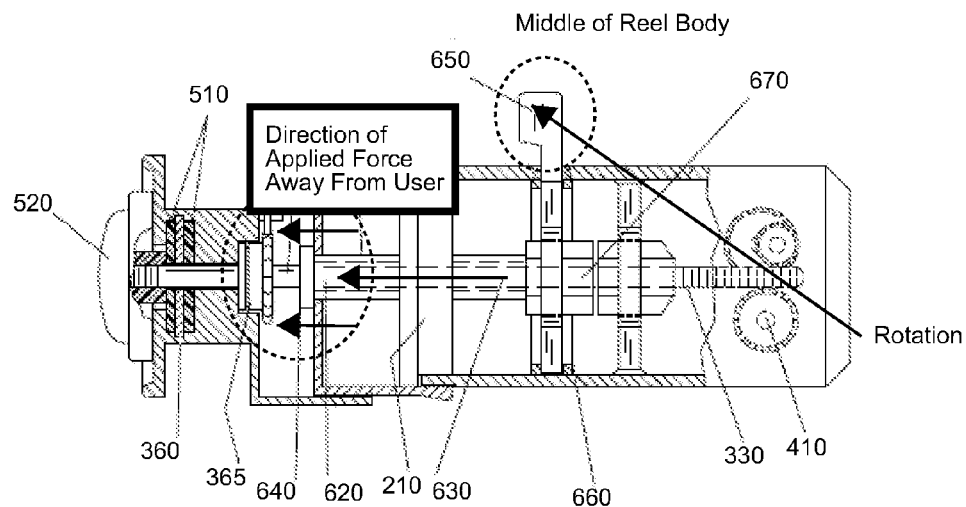
FIG. 5 is a cross-sectional side view of the present invention.

In some embodiments, the present invention provides a pressing force from a spool shaft sleeve bushing (640) against the spool member bushing (365) to impose an auxiliary drag from a separate, independent source onto the spool member (360). This novel mechanism contrasts with the prior art, as illustrated in FIG. 4-5. FIG. 4 is from U.S. Pat. No. 6,769,639.

In some embodiments, the prior art provides an additional pulling force on an existing primary drag system (24), further compressing a clutch pack from a primary drag system (24) using a knob on the second end to impose additional drag on the spool member.

In some embodiments, the present invention applies additional drag to the spool member (360) from a separate, independent mechanism with operational movement in a direction away from a user. The prior art applies additional drag to the spool member using a secondary activation method on the same mechanism with operational movement in a direction toward the user.

In some embodiments, the auxiliary drag lever (650) rotates about 30 degrees. In some embodiments, the auxiliary drag lever (650) rotates about 45 degrees. In some embodiments, the auxiliary drag lever (650) rotates about 90 degrees. In some embodiments, the auxiliary drag lever (650) rotates about 180 degrees.

In some embodiments, the auxiliary drag lever (650) extends through the reel body in a general downward direction when the handle assembly (400) projects from a side. In some embodiments, the auxiliary drag lever (650) extends through the reel body in a general upward direction when the handle assembly (400) projects from a side. In some embodiments, the auxiliary drag lever (650) extends through the reel body in an inline direction with respect to the handle assembly (400) when the handle assembly (400) projects from a side. In some embodiments, the auxiliary drag lever (650) extends through the reel body in an inline, opposite direction with respect to the handle assembly (400) when the handle assembly (400) projects from a side.

In some embodiments, the spool shaft sleeve bushing (640) comprises a friction enhancing lining.

In some embodiments, the spool shaft sleeve (610) is constructed from a metal.

In some embodiments, the auxiliary drag lever (650) comprises a cam-shape, wherein the spool shaft sleeve posterior end (630) comprises a cam-shape, wherein the cam-shaped auxiliary drag lever (650) slidably interfaces with the cam-shaped spool shaft sleeve posterior end (630).

In some embodiments, the auxiliary drag lever (650) is disposed on the reel body anterior end (210). In some embodiments, the auxiliary drag lever (650) is disposed on the reel body posterior end (220). In some embodiments, the auxiliary drag lever (650) is disposed in a middle section of the reel body (200).

As used herein, the term "about" refers to plus or minus 10% of the referenced number. For example, an embodiment wherein the reel body is about 10 inches in length includes a reel body that is between 9 and 11 inches in length.

The disclosures of the following U.S. Patents are incorporated in their entirety by reference herein: U.S. Pat. No. 5,195,698; U.S. Pat. No. 4,470,554; U.S. Pat. No. 4,776,526; U.S. Pat. No. 5,511,735; U.S. Pat. No. 4,881,699; U.S. Pat. No. 7,344,099; U.S. Pat. No. 6,769,639.

Various modifications of the invention, in addition to those described herein, will be apparent to those skilled in the art from the foregoing description. Such modifications are also intended to fall within the scope of the appended claims. Each reference cited in the present application is incorporated herein by reference in its entirety.

Although there has been shown and described the preferred embodiment of the present invention, it will be readily apparent to those skilled in the art that modifications may be made thereto which do not exceed the scope of the appended claims. Therefore, the scope of the invention is only to be limited by the following claims.

The reference numbers recited in the below claims are solely for ease of examination of this patent application, and are exemplary, and are not intended in any way to limit the scope of the claims to the particular features having the corresponding reference numbers in the drawings.

What is claimed is:

1. An auxiliary drag system (100) for a spinning reel providing rapid adjustment for drag when fishing, said system (100) comprising:
   (a) a generally cylindrical reel body (200) having a reel body anterior end (210) and a reel body posterior end (220), wherein the reel body (200) comprises:
      (i) a standard rotor assembly (250) for spooling fishing line onto a spool member (360), wherein said rotor assembly (250) is disposed on the reel body anterior end (210),
      (ii) a standard handle assembly (400) operatively attached to the rotor assembly (250) via drive gears (410), wherein said handle assembly (400) is disposed on the reel body posterior end (220),
      (iii) a standard spool assembly (300) comprising the spool member (360) and a spool shaft (310), wherein said spool member (360) is disposed on the reel body anterior end (210), wherein said spool shaft (310) extends through a central cross-section of the reel body (200),
      (iv) a standard primary drag system (500) having a clutch assembly (510) disposed in the spool assembly (300), wherein the spool member (360) and the spool shaft (310) are operatively connected via the clutch assembly (510); and
   (b) a spool member bushing (365) disposed in a spool member posterior end and a spool shaft sleeve bushing (640) disposed on a spool shaft sleeve anterior end (620),
wherein a spool shaft sleeve (610) having the spool shaft sleeve anterior end (620) and a spool shaft sleeve posterior end (630) is generally disposed over and surrounds at least a portion of the spool shaft (310), wherein said spool shaft sleeve passes through the reel body (200) and the rotor assembly (250), wherein said spool shaft sleeve posterior end (630) interfaces with an auxiliary drag lever (650) slidably disposed in a lever track (660),
wherein said lever track (660) is disposed in the reel body (200), wherein said auxiliary drag lever comprises a centrally disposed threaded auxiliary drag nut (670) affixed thereto, wherein a threaded spool shaft posterior end (330) passes through the threaded auxiliary drag nut (670),
wherein upon rotation of the auxiliary drag lever (650) in a first direction, the spool shaft sleeve (610) is disposed in an inline direction with respect to the spool shaft (310) via the threaded auxiliary drag nut (670) toward and with the spool shaft sleeve bushing (640) frictionally engaging the spool member bushing (365) disposed on the spool member (360) thereby imposing a degree of frictional drag to the rotation of the spool member (360),
wherein upon rotation of the auxiliary drag lever (650) in a second direction, the spool shaft sleeve (610) is disposed in the inline direction with respect to the spool shaft (310) via the threaded auxiliary drag nut (670) away from and with the spool shaft sleeve bushing (640) frictionally disengaging the spool member bushing (365) thereby reducing the degree of frictional drag imposed upon the rotation of the spool member (360);
wherein the auxiliary drag system (100) for the spinning reel provides rapid adjustment for drag when fishing via a pressing force from the spool shaft sleeve bushing (640) against the spool member bushing (365) to impose an auxiliary drag from a separate, independent source onto the spool member (360) apart from the primary drag system (500).

2. The system of claim 1, wherein the auxiliary drag lever (650) rotates about 30 degrees.

3. The system of claim 1, wherein the auxiliary drag lever (650) rotates about 45 degrees.

4. The system of claim 1, wherein the auxiliary drag lever (650) rotates about 90 degrees.

5. The system of claim 1, wherein the auxiliary drag lever (650) rotates about 180 degrees.

6. The system of claim 1, wherein the spool shaft sleeve bushing (640) comprises a friction enhancing lining.

7. The system of claim 1, wherein the spool shaft sleeve (610) is constructed from a metal.

8. The system of claim 1, wherein the auxiliary drag lever (650) comprises a cam-shape, wherein the spool shaft sleeve posterior end (630) comprises a cam-shape, wherein the cam-shaped auxiliary drag lever (650) slidably interfaces with the cam-shaped spool shaft sleeve posterior end (630).

9. An auxiliary drag system (100) for a spinning reel providing rapid adjustment for drag when fishing, said system (100) consisting of:
   (a) a generally cylindrical reel body (200) having a reel body anterior end (210) and a reel body posterior end (220), wherein the reel body (200) consists of:
      (i) a standard rotor assembly (250) for spooling fishing line onto a spool member (360), wherein said rotor assembly (250) is disposed on the reel body anterior end (210),
      (ii) a standard handle assembly (400) operatively attached to the rotor assembly (250) via drive gears (410), wherein said handle assembly (400) is disposed on the reel body posterior end (220),
      (iii) a standard spool assembly (300) consisting of the spool member (360) and a spool shaft (310), wherein said spool member (360) is disposed on the reel body anterior end (210), wherein said spool shaft (310) extends through a central cross-section of the reel body (200),
      (iv) a standard primary drag system (500) having a clutch assembly (510) disposed in the spool assembly (300), wherein the spool member (360) and the spool shaft (310) are operatively connected via the clutch assembly (510); and
   (b) a spool member bushing (365) disposed in a spool member posterior end and a spool shaft sleeve bushing (640) disposed on a spool shaft sleeve anterior end (620),
wherein a spool shaft sleeve (610) having the spool shaft sleeve anterior end (620) and a spool shaft sleeve posterior end (630) is generally disposed over and surrounds at least a portion of the spool shaft (310), wherein said spool shaft sleeve passes through the reel body (200) and the rotor assembly (250), wherein said spool shaft sleeve posterior end (630) interfaces with an auxiliary drag lever (650) slidably disposed in a lever track (660),
wherein said lever track (660) is disposed in the reel body (200), wherein said auxiliary drag lever consists of a centrally disposed threaded auxiliary drag nut (670) affixed thereto, wherein a threaded spool shaft posterior end (330) passes through the threaded auxiliary drag nut (670),
wherein upon rotation of the auxiliary drag lever (650) in a first direction, the spool shaft sleeve (610) is disposed in an inline direction with respect to the spool shaft (310) via the threaded auxiliary drag nut (670) toward and with the spool shaft sleeve bushing (640) frictionally engaging the spool member bushing (365) disposed on the spool member (360) thereby imposing a degree of frictional drag to the rotation of the spool member (360), wherein upon rotation of the auxiliary drag lever (650) in a second direction, the spool shaft sleeve (610) is disposed in the inline direction with respect to the spool shaft (310) via the threaded auxiliary drag nut (670) away from and with the spool shaft sleeve bushing (640) frictionally disengaging the spool member bushing (365) thereby reducing the degree of frictional drag imposed upon the rotation of the spool member (360);

wherein the auxiliary drag system (100) for the spinning reel provides rapid adjustment for drag when fishing via a pressing force from the spool shaft sleeve bushing (640) against the spool member bushing (365) to impose an auxiliary drag from a separate, independent source onto the spool member (360) apart from the primary drag system (500).

\* \* \* \* \*